(12) United States Patent
Thalhauser et al.

(10) Patent No.: US 10,858,988 B2
(45) Date of Patent: Dec. 8, 2020

(54) COMPRESSOR BYPASS DURING START-UP

(71) Applicant: INNIO Jenbacher GmbH & Co OG, Jenbach (AT)

(72) Inventors: Josef Thalhauser, Jenbach (AT); Nikolaus Spyra, Jenbach (AT); Georg Arnold, Jenbach (AT)

(73) Assignee: INNIO Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 16/272,398

(22) Filed: Feb. 11, 2019

(65) Prior Publication Data
US 2019/0257242 A1   Aug. 22, 2019

(30) Foreign Application Priority Data

Feb. 21, 2018   (EP) .................................... 18157811

(51) Int. Cl.
*F02B 37/16* (2006.01)
*F02D 41/00* (2006.01)
*F02D 41/06* (2006.01)

(52) U.S. Cl.
CPC ............ *F02B 37/16* (2013.01); *F02B 37/162* (2019.05); *F02D 41/0002* (2013.01); *F02D 41/0007* (2013.01); *F02D 41/062* (2013.01); *F02D 41/061* (2013.01); *F02D 2200/0402* (2013.01)

(58) Field of Classification Search
CPC ............. F02B 37/16; F02D 2200/0402; F02D 41/0007
See application file for complete search history.

(56) References Cited

U.S. PATENT DOCUMENTS

| 4,774,812 A | 10/1988 | Hitomi et al. |
| 5,477,839 A * | 12/1995 | Oshima ............... F02B 29/0412 123/559.3 |
| 6,883,324 B2 * | 4/2005 | Igarashi .................. F02B 33/40 123/564 |

(Continued)

FOREIGN PATENT DOCUMENTS

| EP | 1317613 B1 | 4/2004 |
| EP | 1872001 A2 | 5/2006 |

(Continued)

OTHER PUBLICATIONS

European Search Report and Written Opinion dated Aug. 15, 2018 which was issued in connection with EP 18157811.3 which was filed on Feb. 21, 2019.

*Primary Examiner* — Jesse S Bogue
(74) *Attorney, Agent, or Firm* — Fletcher Yoder, P.C.

(57) ABSTRACT

An internal combustion engine comprising at least one turbo charger, which comprises a compressor, at least one bypass valve, through which the compressor can be bypassed by at least a partial stream of air or an air-fuel mixture, and a control unit is provided. The control unit is configured to open or closed loop control the bypass valve. As such, the control unit is configured to at least partially open the at least one bypass valve and keep the at least one bypass valve open during a start of the internal combustion engine. The control unit is also configured to keep the at least one bypass valve open until an engine parameter of the internal combustion engine satisfies a predetermined startup criterion.

18 Claims, 3 Drawing Sheets

(56) References Cited

U.S. PATENT DOCUMENTS

| | | | |
|---|---|---|---|
| 8,347,613 B2 | 1/2013 | Van Nieuwstadt | |
| 8,739,518 B2 | 6/2014 | Van Nieuwstadt | |
| 8,925,302 B2 | 1/2015 | Ruona et al. | |
| 8,958,972 B1 | 2/2015 | Fisher | |
| 8,978,378 B2 * | 3/2015 | Wade | F02B 37/16 60/602 |
| 9,382,858 B1 | 7/2016 | Surnilla et al. | |
| 9,404,415 B2 | 8/2016 | Ruona et al. | |
| 9,874,191 B2 * | 1/2018 | Xiao | F02B 33/40 |
| 2003/0136378 A1 | 7/2003 | Sauler et al. | |
| 2004/0055299 A1 * | 3/2004 | Bernard | F02B 37/16 60/611 |
| 2006/0102136 A1 | 5/2006 | Bromberg et al. | |
| 2008/0149077 A1 | 6/2008 | Nau et al. | |
| 2009/0265080 A1 * | 10/2009 | Fry | F02B 37/162 701/103 |
| 2011/0072797 A1 | 3/2011 | Herman | |
| 2011/0077847 A1 * | 3/2011 | Barr | F02B 33/446 701/113 |
| 2012/0055152 A1 | 3/2012 | Petrovic | |
| 2014/0060006 A1 | 3/2014 | Ruona et al. | |
| 2015/0057853 A1 | 2/2015 | Fisher | |
| 2015/0113980 A1 | 4/2015 | Ruona et al. | |
| 2015/0139777 A1 * | 5/2015 | Almkvist | F02D 41/0007 415/1 |
| 2015/0152777 A1 * | 6/2015 | Kim | F02B 37/16 60/602 |
| 2016/0177858 A1 | 6/2016 | Surnilla et al. | |
| 2018/0100456 A1 * | 4/2018 | Yokono | F02B 37/18 |
| 2018/0135571 A1 * | 5/2018 | Fuchs | F02B 37/013 |
| 2019/0048788 A1 * | 2/2019 | Mitsuyama | F02B 37/013 |

FOREIGN PATENT DOCUMENTS

| | | |
|---|---|---|
| EP | 2489851 A1 | 8/2012 |
| WO | 2006108076 A2 | 10/2006 |
| WO | 2016172748 A1 | 11/2016 |

* cited by examiner

COMPRESSOR BYPASS DURING START-UP

FIELD OF TECHNOLOGY

The present disclosure relates to an internal combustion engine according to the characteristics of the classifying portion of claims 1 and a method for operating an internal combustion engine.

BACKGROUND

It is known by the state of the art to prevent an internal combustion engine with at least one turbo charger. The turbo charger is provided with a compressor, wherein by means of the compressor air or an air-fuel mixture can be charged. It is also known to provide at least one bypass valve, through which the compressor can be bypassed by at least a partial stream of air or an air-fuel mixture. This bypass valve can be open or closed loop controlled by a control unit. In this way the charge pressure of the internal combustion engine and therefore the power-output of the internal combustion engine can be open or closed loop controlled with relatively short reaction times. Thereby the bypass valve will be closed if more power or a higher rotational speed of the internal combustion engine is required.

A disadvantage is that if the internal combustion engine is started, the air or the air-fuel mixture has to be conveyed to the combustion chambers. In the first phase of the engine start the turbo charger or more specific the compressor has a low rotational speed and behaves as a flow restriction for the air or air-fuel mixture bound for the combustion chambers. Because of this behavior of the compressor of the turbo charger the flow of air or an air-fuel mixture is delayed during the starting process until the compressor of the turbocharger builds up pressure when the turbocharger reaches a certain rotational speed. This leads to a relative long starting time of the internal combustion engine as the turbocharger has a high mass moment of inertia.

SUMMARY OF THE DISCLOSURE

The object of the present application is to provide an internal combustion engine and a method for operating an internal combustion engine, wherein the time for starting the internal combustion engine is significantly reduced.

This object is accomplished according to the subject disclosure with an internal combustion engine having the characteristics of claim 1 and with a method for operating an internal combustion engine having the characteristics of claim 13.

By means of the subject disclosure air or an air-fuel mixture, which is required for combustion, can—choosing the path of least resistance—flow as quickly as possible to a combustion zone, which is provided for the combustion, this could for example be a combustion chamber of the internal combustion engine.

For starting the internal combustion engine the internal combustion engine is driven—for example—by an auxiliary drive, till air or an air-fuel mixture arrives at the combustion zone, which is provided for an ignition. As soon as the air or the air-fuel mixture arrives at the place provided for an ignition, ignition can take place and the internal combustion engine starts running without any external help (for example without the help of an auxiliary drive).

As soon the internal combustion engine starts running without any external help also the turbo charger starts its operation. In other words, the compressor starts to convey the air or air-fuel flow and the air or air-fuel is not only sucked by the internal combustion engine.

The disclosure is based on the knowledge that during the start of the internal combustion engine, wherein air or an air-fuel mixture is sucked by the internal combustion engine, the time for starting can be reduced by having the air or air-fuel mixture bypass the compressor keeping the bypass valve open till the engine parameter of the internal combustion engine satisfies a predetermined startup criterion. In this way the air or air-fuel flow can bypass the compressor during at least the substantial phase of the starting procedure, whereby the flow resistance is reduced.

The air or air-fuel flow arrives at the provided zone for ignition faster. It should be noted that the flow of air or air-fuel flow will be reverse as soon as the compressor of the turbo charger starts its operation. This is the consequence of the fact that the presser downstream of the compressor is higher than upstream the compressor.

Therefore, according to the disclosure a control unit is provided, which is configured to open the at least one bypass valve at least partially and keep it open during a start of the internal combustion engine, characterised in that the control unit is configured to keep the at least one bypass unit open till an engine parameter of the internal combustion engine satisfies a predetermined startup criterion.

The bypass valve can be arranged in a bypass conduct bypassing the compressor. However, it is in principle also possible to arrange incoming and outgoing conducts for the compressor in such a way that only the bypass valve itself is necessary.

The embodiments of the disclosure are defined by the depending claims.

The disclosure can be used for internal combustion engines having one turbo charger or more than one. By the use of more than one turbo charger, the turbo chargers can be connected in series or in parallel.

It can be provided that the engine parameter is a pressure difference before and after the compressor in flow direction, wherein the predetermined startup criterion is a predetermined pressure difference. This predetermined pressure difference can for example be determined by tests.

In an embodiment it can be provided that the engine parameter is a rotational speed of the turbo charger or the internal combustion engine, wherein the predetermined startup criterion is a lower threshold, wherein the control unit keeps the at least one bypass valve open till the rotational speed attains or exceeds the predetermined lower threshold.

Alternatively or additionally it can be provided that the engine parameter is a time since beginning of the starting procedure, wherein the predetermined startup criterion is a lower threshold, wherein the control unit keeps the at least one bypass valve open till the time since the beginning of the starting procedure attains or exceeds the predetermined lower threshold. The beginning of the start procedure can for example be the point in time where an auxiliary drive is activated.

It can be provided that the predetermined startup criterion is chosen such that it is fulfilled at such a point in time, when the internal combustion engine is running without the action of an auxiliary drive.

At an embodiment of the disclosure it is provided that one upstream sensor is provided in flow direction upstream of the compressor, wherein the at least one upstream sensor is configured to provide the control unit with a characteristic signal for an upstream pressure. Alternatively it can also be provided that a pressure value is provided for the control unit, which is characteristic for the ambient pressure of the internal combustion engine.

It can be provided that at least one downstream sensor is provided in flow direction downstream of the compressor, wherein the at least one downstream sensor is configured to provide the control unit with a characteristic signal for a downstream pressure.

In addition it can be provided, that the control unit is configured to determine a pressure difference, from measurement of the at least one downstream sensor and the measurements of the at least one upstream sensor. In many instances it is, however, possible to not use an upstream sensor and to use the usual ambient pressure for determination of the pressure difference.

It can also be provided that at least one rotational speed sensor is provided to determine a characteristic signal for the rotational speed of the internal combustion engine or the turbo charger, wherein the control unit can be provided with the characteristic signal of the at least one rotational speed sensor.

In a further embodiment of the disclosure it can be provided that the control unit is configured to open or closed loop control the opening degree of the bypass valve.

It can be provided that that the control unit is a mechanical and/or electronic control unit. A simple example for a mechanical control unit would be a spring pre-load for a check valve, wherein the pre-load of the spring is chosen such that the check valve closes when the internal combustion engine starts to run on its own, in other words, when the pressure downstream of the bypass will increase above a pressure value upstream of the bypass.

Further, it can be provided that at least one further component of the internal combustion engine can be bypassed by the at least one bypass valve. For example also an intercooler would be a further component that could be bypassed.

Furthermore protection is sought for a method for operating an internal combustion engine, wherein a bypass valve for bypassing a compressor of the at least one turbo charger is provided, which is at least partially kept open during a start of the internal combustion engine till an engine parameter of the internal combustion engine satisfies a predetermined startup criterion.

BRIEF DESCRIPTION OF THE DRAWINGS

Further details of the present disclosure will be described with reference to the specific description hereinafter. In the drawing.

DETAILED DESCRIPTION

Figure 1:
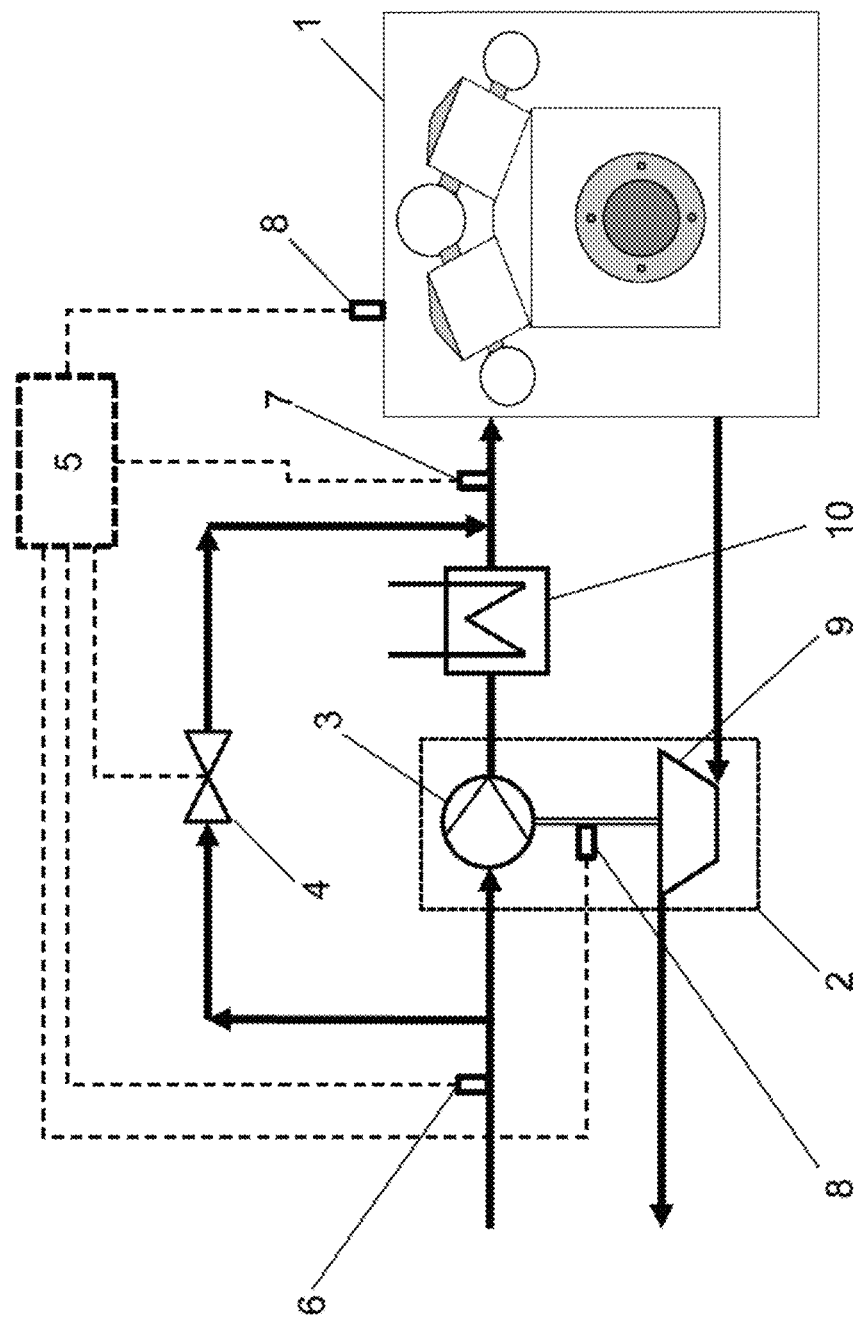
FIG. 1 shows a first embodiment of an international combustion engine.

FIG. 1 shows a first embodiment of an international combustion engine 1, wherein the internal combustion engine 1 comprises a turbo charger 2. By means of the turbo charger 2 air or an air-fuel mixture can be charged for the combustion in the internal combustion engine 1. This air or air-fuel mixture is charged by the compressor 3 of the turbo charger 2. The turbo charger 2 further comprises an exhaust gas turbine 9, which is connected to the compressor 3 by a shaft. The exhaust gas turbine 9 is driven by exhaust gas coming from the internal combustion engine 1, where the exhaust gas is produced combusting of the air fuel mixture. This combustion normally takes place in the combustion chambers of the internal combustion engine 1 (not shown by the figures). For combustion in mixed charged internal combustion engines a charged air-fuel mixture is fed to the internal combustion engine 1. For combustion in charged internal combustion engines having a fuel port injection a charged air is fed to the internal combustion engine 1, a fuel is separately fed to the internal combustion engine 1 by means of port injection nozzles. When charging air or an air-fuel mixture the air or the air-fuel mixture also is heated by the compression operation. For reducing the temperature of the air or the air-fuel mixture an intercooler 10 is provided.

The compressor 3 and the intercooler 10 can be bypassed by means of a bypass conduct and a bypass valve 4. This bypass valve 4 is connected by a signal line (presented by the dotted line) with a control unit 5, which is configured to open or closed loop control the bypass valve 4. Furthermore an upstream sensor 6 is provided, which is connected with the control unit 5 by usage of a signal line. The upstream sensor 6 is configured to provide the control unit 5 with a characteristic signal for an upstream pressure (downstream of the compressor 3). Also a downstream sensor 7 is provided which is also connected to the control unit 5 by a signal line. The downstream sensor 7 is configured to provide the control unit 5 with a characteristic signal for a downstream pressure (upstream of the compressor 3). The control unit 5 is configured to determine a pressure difference, from measurement of the downstream sensor 7 and the upstream sensor 6. This pressure difference can be used by the control unit 5 for control an opening degree of the bypass valve 5.

During a startup of the internal combustion engine 1 the control unit is configured (according to the disclosure) to keep the bypass valve 4 partially open till an engine parameter of the internal combustion engine 1 satisfies a predetermined startup criterion. This startup criterion can be characteristic for a state were the internal combustion engine runs on its own, for example without the help of an auxiliary drive (not shown in the figures). Such a startup criterion could—for example—be a threshold value for the above mentioned pressure difference. If the pressure measured by the downstream sensor 7 exceeds the measured pressure of the upstream sensor 6 (taking into account measurement inaccuracy) this can be characteristic for a start of the internal combustion engine (i.e. threshold value 0). It is not absolutely necessary to determine a pressure upstream of the compressor 3 by an upstream sensor 6. It can also be provided that an ambient pressure is stored at the control unit 5, which approximates the upstream pressure of the compressor 3.

Other examples for a startup criterion would be a predetermined threshold for a rotary speed of the internal combustion engine 1 or the turbo charger 2. For checking if this criterion is fulfilled already provided rotary speed sensors 8 can be used. Another possibility for a startup criterion is that if the time since the start of the operation attains or exceeds a predetermined lower threshold the control unit 5 does not longer keep the bypass valve 4 open (i.e. closes it).

Figure 2:
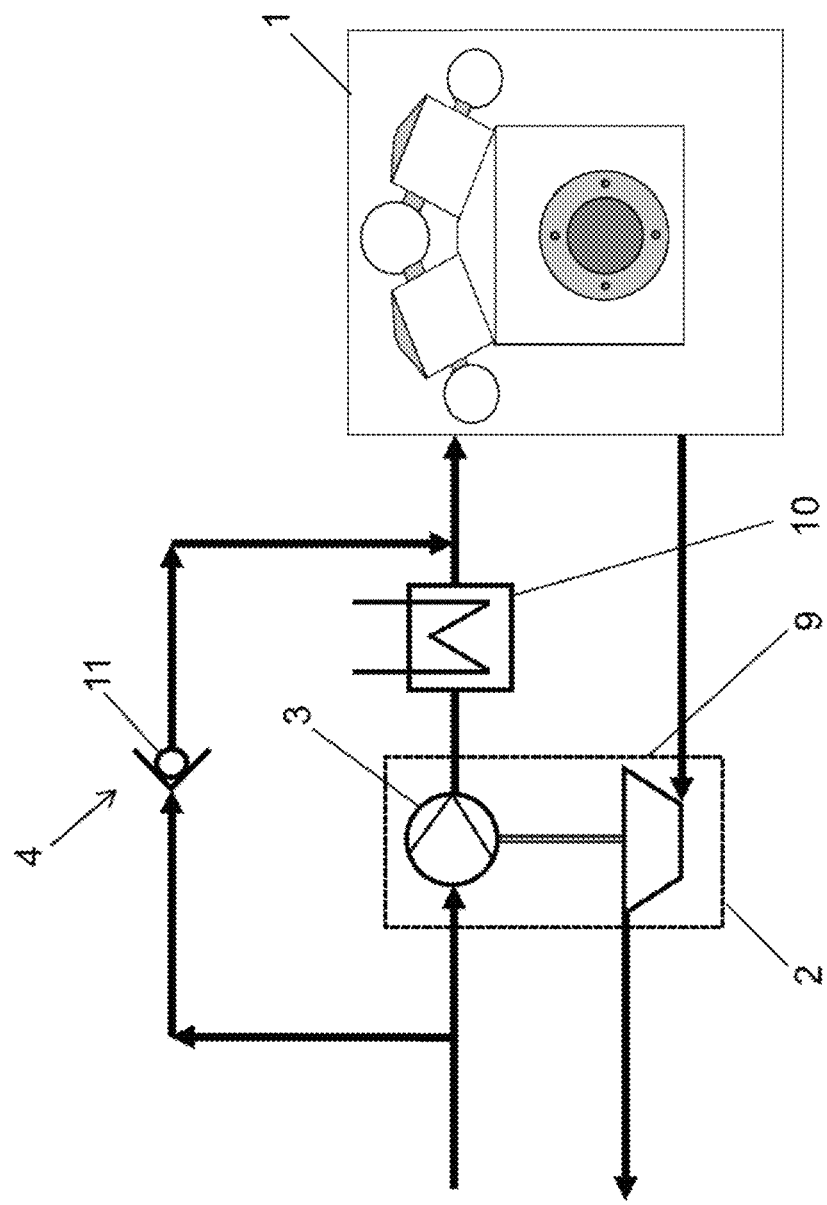
FIG. 2 shows second embodiment of an international combustion engine.

FIG. 2 shows a second embodiment of an international combustion engine 1, wherein the bypass valve 4 is provided with a check valve 11. The internal combustion engine 1 the turbo charger 2 and the intercooler 10 correspond to the embodiment of FIG. 1. The check valve 11 of FIG. 2 is configured with a spring preloading to be kept open during starting of the internal combustion engine 1, i.e. when the pressure downstream of the compressor 3 is be lower than the upstream pressure because the internal combustion engine 1 sucks air or an air-fuel mixture.

Figure 3:
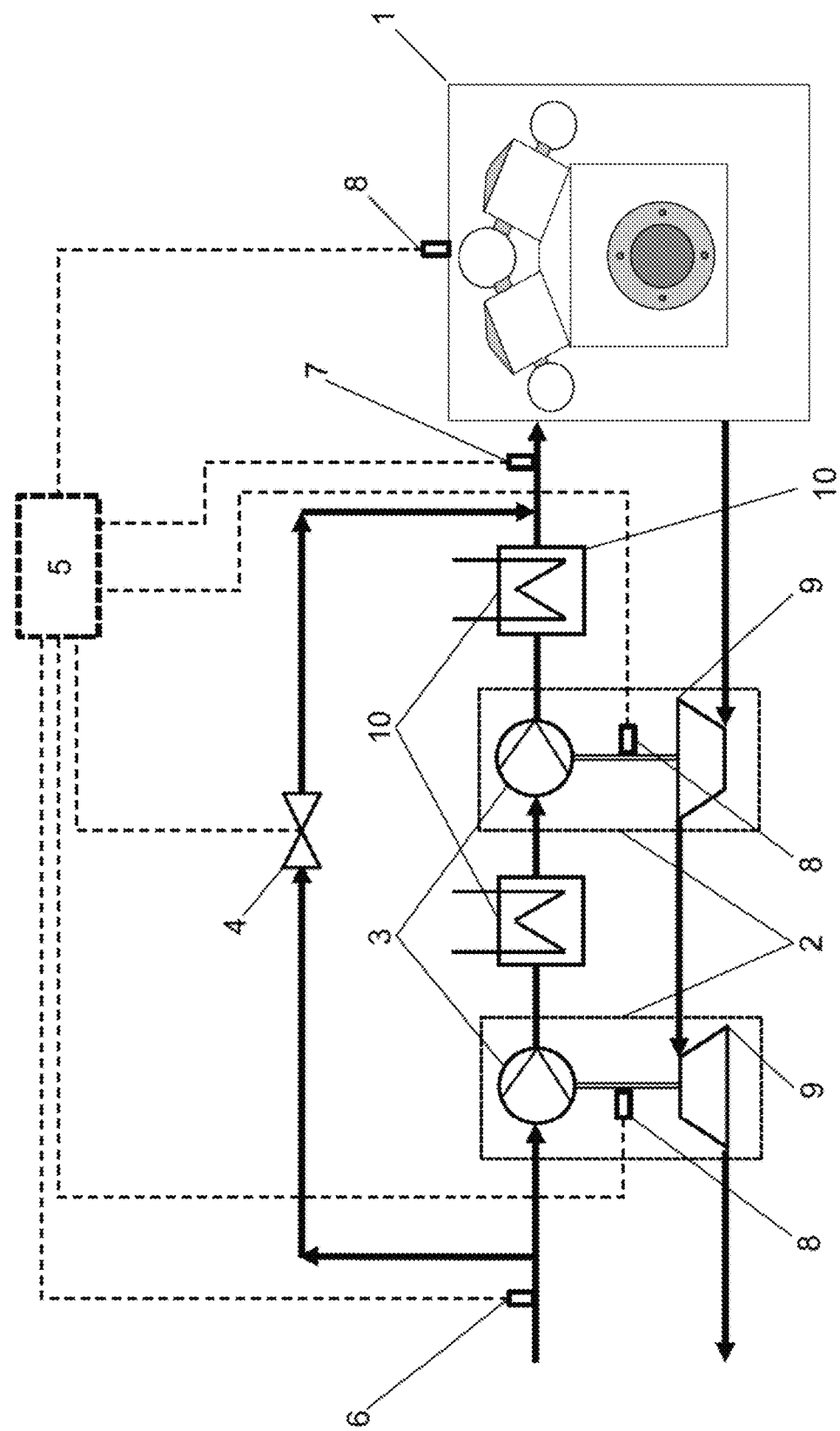
FIG. 3 shows third embodiment of an international combustion engine.

The third embodiment of an internal combustion engine 1 of FIG. 3 shows an example, wherein further components of the internal combustion engine are bypassed by the bypass valve 4. This embodiment teaches the use of two turbo chargers 2, wherein each turbo charger comprises a compressor, an exhaust gas turbine 9, a connection between the compressor 3 and the exhaust gas turbine 9 by a shaft, a rotational speed sensor 8 for determine a characteristic signal for each turbo charger 2 and an intercooler 10 downstream of each turbo charger 2. The rotational speed sensors 8 are configured to provide the control unit 5 with a signal, which can be used by the control unit 5 for open or closed loop control of the bypass valve 4. This control scheme is similar to the control scheme of FIG. 1. However, in contrast to FIG. 1, FIG. 3 teaches to bypass two turbo chargers 2 and two intercoolers 10 by means of the bypass valve 4 during a starting procedure of the internal combustion engine 1.

What we claim is:

1. An internal combustion engine, comprising:
   at least one turbo charger comprising a compressor disposed along an intake flow path, wherein the compressor is configured to compress an intake flow of air or an air-fuel mixture;
   at least one bypass valve disposed along a bypass flow path coupled to the intake flow path at an upstream position and a downstream position relative to the compressor; and
   a control unit configured to open or closed loop control the at least one bypass valve;
   wherein the control unit is configured to at least partially open the at least one bypass valve and keep it open during a start of the internal combustion engine, wherein the at least one bypass valve, when at least partially open, is configured to divert at least a partial stream of the intake flow of the air or the air-fuel mixture through the bypass flow path to bypass the compressor, wherein the control unit is configured to keep the at least one bypass valve open until an engine parameter of the internal combustion engine satisfies a predetermined startup criterion, wherein the engine parameter comprises an operational state of an auxiliary drive configured to drive the internal combustion engine during the start, wherein the predetermined startup criterion is chosen such that it is fulfilled at such a point in time when the internal combustion engine is running without the action of the auxiliary drive.

2. The internal combustion engine as set forth in claim 1, wherein the engine parameter further comprises a pressure difference before and after the compressor in a flow direction, and wherein the predetermined startup criterion further comprises a predetermined pressure difference.

3. The internal combustion engine as set forth in claim 1, wherein the engine parameter further comprises a rotational speed of the turbo charger or the internal combustion engine, wherein the predetermined startup criterion further comprises a predetermined lower threshold, and wherein the control unit keeps the at least one bypass valve open until the rotational speed attains or exceeds the predetermined lower threshold.

4. The internal combustion engine as set forth in claim 1, wherein the engine parameter further comprises a time since a beginning of a start procedure, wherein the predetermined startup criterion further comprises a predetermined lower threshold, and wherein the control unit keeps the at least one bypass valve open until the time since the start attains or exceeds the predetermined lower threshold.

5. The internal combustion engine as set forth in claim 1, comprising one or more sensors configured to obtain a characteristic signal indicative of the engine parameter.

6. The internal combustion engine as set forth in claim 5, wherein the one or more sensors comprise a rotational speed sensor configured to obtain the characteristic signal indicative of a rotational speed of the at least one turbo charger as a further engine parameter.

7. The internal combustion engine as set forth in claim 5, wherein the one or more sensors comprise at least one pressure sensor, and the control unit is configured to determine a pressure difference across the compressor based at least in part on a measurement from the at least one pressure sensor.

8. The internal combustion engine as set forth in claim 5, wherein the one or more sensors comprise a rotational speed sensor configured to obtain a further characteristic signal for a rotational speed of the internal combustion engine as a further engine parameter.

9. The internal combustion engine as set forth in claim 1, wherein the control unit is configured to open or closed loop control an opening degree of the bypass valve.

10. The internal combustion engine as set forth in claim 1, wherein the control unit is a mechanical and/or electronic control unit.

11. The internal combustion engine as set forth in claim 1, wherein the bypass flow path having the at least one bypass valve is configured to bypass the compressor and at least one further component of the internal combustion engine.

12. A method, comprising:
    operating a bypass valve for bypassing a compressor of at least one turbo charger of an internal combustion engine, wherein the compressor is configured to compress an intake flow of air or an air-fuel mixture along an intake flow path, and the bypass valve is disposed along a bypass flow path coupled to the intake flow path at an upstream position and a downstream position relative to the compressor; and
    keeping the bypass valve at least partially open during a start of the internal combustion engine until an engine parameter of the internal combustion engine satisfies a predetermined startup criterion, wherein the bypass valve, when at least partially open, is configured to divert at least a partial stream of the intake flow of the air or the air-fuel mixture through the bypass flow path to bypass the compressor, wherein the engine parameter comprises an operational state of an auxiliary drive configured to drive the internal combustion engine during the start, wherein the predetermined startup criterion is chosen such that it is fulfilled at such a point in time when the internal combustion engine is running without the action of the auxiliary drive.

13. The method as set forth in claim 12, wherein the compressor is configured to compress the intake flow of the air-fuel mixture, wherein the bypass valve, when at least partially open, is configured to divert at least the partial stream of the intake flow of the air-fuel mixture through the bypass flow path to bypass the compressor during the start.

14. The internal combustion engine as set forth in claim 1, wherein the compressor is configured to compress the intake flow of the air-fuel mixture, wherein the at least one bypass valve, when at least partially open, is configured to divert at least the partial stream of the intake flow of the air-fuel mixture through the bypass flow path to bypass the compressor during the start.

15. A system, comprising:
a controller of an internal combustion engine configured to:
monitor an engine parameter during a start of the internal combustion engine, wherein the internal combustion engine comprises an intake flow path having a compressor configured to compress an intake flow of air or an air-fuel mixture, and a bypass valve disposed along a bypass flow path coupled to the intake flow path at an upstream position and a downstream position relative to the compressor; and
control the bypass valve to at least partially open during the start and remain open until the engine parameter satisfies a predetermined startup criterion, wherein the bypass valve, when at least partially open, is configured to divert at least a partial stream of the intake flow of the air or the air-fuel mixture through the bypass flow path to bypass the compressor, wherein the engine parameter comprises an operational state of an auxiliary drive configured to drive the internal combustion engine during the start, wherein the predetermined startup criterion is chosen such that it is fulfilled at such a point in time when the internal combustion engine is running without the action of the auxiliary drive.

16. The system as set forth in claim 15, wherein the compressor is configured to compress the intake flow of the air-fuel mixture, wherein the bypass valve, when at least partially open, is configured to divert at least the partial stream of the intake flow of the air-fuel mixture through the bypass flow path to bypass the compressor during the start.

17. The system as set forth in claim 15, wherein the engine parameter further comprises a rotational speed of the compressor, and the predetermined startup criterion further comprises a lower speed threshold.

18. The system as set forth in claim 15, comprising the compressor and the bypass valve, wherein the compressor is driven by an exhaust gas turbine of a turbo charger.

* * * * *